(12) United States Patent
Valenzuela et al.

(10) Patent No.: US 10,855,861 B2
(45) Date of Patent: Dec. 1, 2020

(54) REFLECTIVE SHEET COUPLING

(71) Applicant: Hewlett-Packard Development Company, L.P., Spring, TX (US)

(72) Inventors: Rene Valenzuela, San Diego, CA (US); Ryan M Smith, San Diego, CA (US); Keng Leong Ng, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,596

(22) PCT Filed: Sep. 9, 2016

(86) PCT No.: PCT/US2016/051054
§ 371 (c)(1),
(2) Date: Mar. 8, 2019

(87) PCT Pub. No.: WO2018/048424
PCT Pub. Date: Mar. 15, 2018

(65) Prior Publication Data
US 2019/0230238 A1     Jul. 25, 2019

(51) Int. Cl.
    *H04N 1/00*        (2006.01)
    *H04N 1/10*        (2006.01)
    *G03G 15/00*      (2006.01)

(52) U.S. Cl.
CPC ....... *H04N 1/00551* (2013.01); *G03G 15/605* (2013.01); *H04N 1/00* (2013.01); *H04N 1/0066* (2013.01); *H04N 1/1017* (2013.01); *H04N 2201/0094* (2013.01); *H04N 2201/0422* (2013.01)

(58) Field of Classification Search
None
See application file for complete search history.

(56) References Cited

U.S. PATENT DOCUMENTS

| | | |
|---|---|---|
| 6,697,600 B2 | 2/2004 | Nishikino et al. |
| 9,154,656 B2 | 10/2015 | Yamasaki |
| 9,197,780 B2 | 11/2015 | Tokonami |
| 9,319,545 B2 * | 4/2016 | Oizumi .............. H04N 1/00559 |
| 2003/0076550 A1 | 4/2003 | Cheung et al. |
| 2005/0036176 A1 | 2/2005 | Harris |
| 2006/0140693 A1 | 6/2006 | Takami |
| 2014/0029071 A1 | 1/2014 | Roth et al. |
| 2016/0150101 A1 | 5/2016 | Kikuta |

FOREIGN PATENT DOCUMENTS

| | | | |
|---|---|---|---|
| JP | 2000261601 A | * | 9/2000 |
| JP | 2002311521 A | | 10/2002 |

* cited by examiner

*Primary Examiner* — Thomas D Lee
(74) *Attorney, Agent, or Firm* — HP Inc. Patent Department

(57) ABSTRACT

One example includes a device that is comprised of a cover housing, a reflective sheet, a coupler, and a fastener. The reflective sheet may hold media against a planar transparent scanning area of the device. The coupler may removably attach the reflective sheet to the cover housing, the coupler having a resilient member to exert an axial restoring force between the reflective sheet and the cover housing. The fastener may fix the coupler to the reflective sheet.

15 Claims, 8 Drawing Sheets

REFLECTIVE SHEET COUPLING

BACKGROUND

Flatbed type optical scanners are used for document and image reproduction, such as in photocopiers (also known as copiers or copy machines) or other imaging devices, such as standalone scanners or multi-function peripheral devices. When a scan is being made, a cover carrying a reflective sheet is typically placed over the media object being optically scanned. For instance, the reflective sheet is to align with respect to the scanning surface to provide a seal that prevents external light from affecting the scanning process.

DETAILED DESCRIPTION

This disclosure relates generally to a reflective sheet coupling. The coupling systems and methods disclosed herein may employ detachable couplers to attach the reflective sheet to a cover housing for providing desired alignment and engagement with a scanning surface. In addition to helping ensure alignment between the reflective sheet and a scanning window during use, the systems and methods disclosed herein may facilitate removal and replacement of the reflective sheet for a scanning device, such as may be part of a scanner, copier or multi-function peripheral.

As an example, detachable couplers may be used to attach the reflective sheet to the cover housing. Each of the detachable couplers may include a clip and resilient element (e.g., a spring) that may help align and hold the reflective sheet in a desired position with respect to the cover housing. The detachable couplers may help ensure that the reflective sheet remains flat against a glass of a scanning mechanism that the reflective sheet comes into contact with. For example, each of the clips may include legs that extend from a base portion thereof to terminate in an outwardly protruding portion. The legs and outwardly protruding portion may be dimensioned and configured to enable insertion into and corresponding apertures of the cover housing to hold the reflective sheet in place. Additionally, should the reflective sheet become detached from the cover housing or otherwise need replacement (e.g., if damaged), the detachable couplers may allow the user or technician to remove the reflective sheet from the cover housing, thereby greatly simplifying removal. The user or technician may then insert pre-aligned detachable couplers of a new reflective sheet into apertures of the cover housing, further simplifying installation and alignment of the new reflective sheet.

Figure 1:
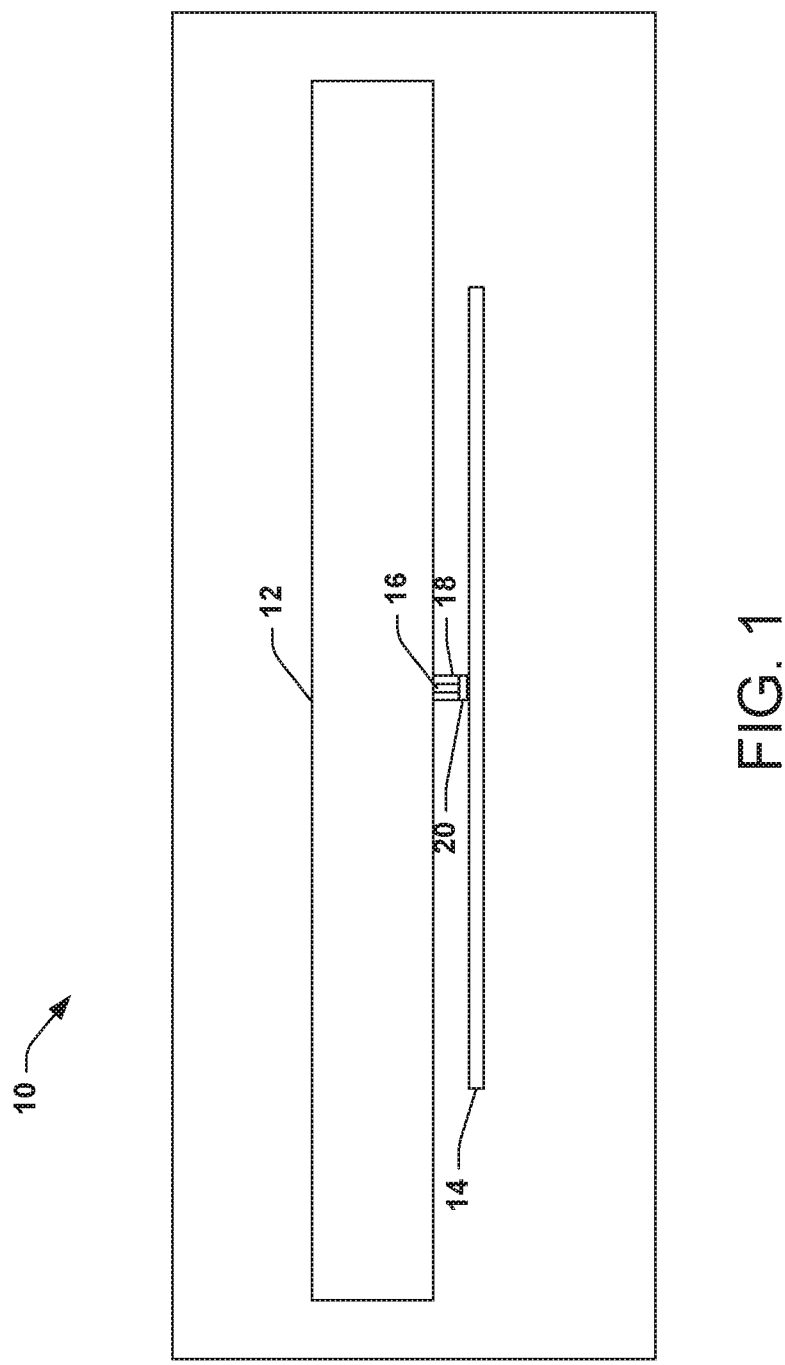
FIG. 1 illustrates an example of a scanning device.

FIG. 1 illustrates an example of a device 10. The device 10 may include a cover housing 12 and a reflective sheet 14 to hold media against a planar transparent scanning area of the device 10. The device may also include a coupler 16 to removably attach the reflective sheet 14 to the cover housing 12. The coupler 16 has a resilient member 18 to exert an axial restoring force between the reflective sheet 14 and the cover housing 12. The device further may include a fastener 20 to fix each coupler 16 to the reflective sheet 14.

Figure 2:
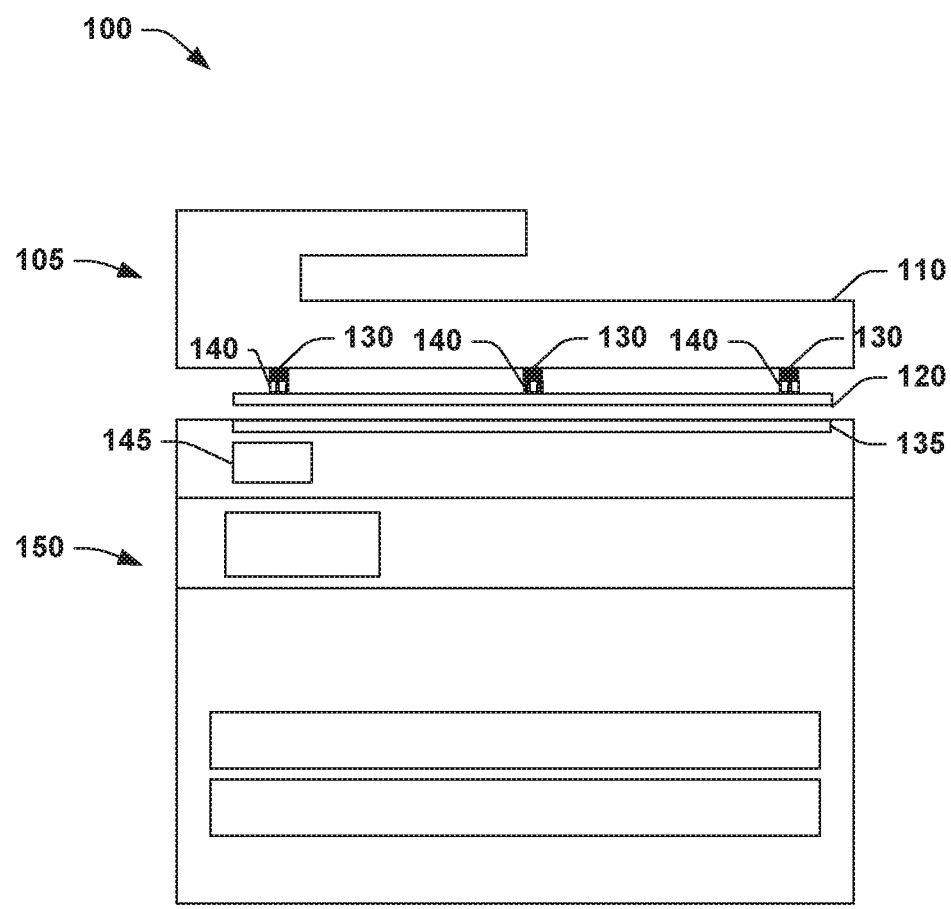
FIG. 2 illustrates another example of a scanning device.

FIG. 2 illustrates an example of a system 100, such as constituting the device 10 introduced in FIG. 1. For example, the system 100 may further include a scanning base portion 150 and a cover portion 105. The surface of the scanning base portion 150 may include the planar transparent scanning area 135. An optical scanning mechanism 145 may reside in the scanning base portion 150 beneath the scanning area to acquire optical images of media that is placed on the planar transparent scanning area 135. The reflective sheet 120 may be sized to match a size of the planar transparent scanning area 135. In some examples, the scanning base portion 150 may also includes one or more document drawers and a control panel. The scanning base portion 150 may also include a printing mechanism and place for holding media onto which text and images may be printed, depending on the functionality of the system 100.

In an example, a plurality of detachable couplers 130 may hold the reflective sheet 120 to the cover housing 110 of the cover portion 105. Likewise, the plurality of detachable couplers 130 may be affixed to the reflective sheet 120 via a plurality of fasteners 140 affixed to the plurality of detachable couplers 130, respectively. The cover portion 105 may be attached to the scanning base portion 150 via one or more hinges positioned along one edge of the cover portion 105. Such a hinge(s) may allow the cover housing 110 to move out of the way when a document is manually being loaded onto the glass scanning area of the scanning base portion 150. In an example, the hinge(s) may allow the cover portion 105 to move away from the base portion 150 while remaining substantially parallel to the base portion 150 to account for unusually thick documents, commonly referred to as a book mode. When the cover portion 105 is in a closed position, the reflective sheet 120 may lie flat against and in alignment with the planar transparent scanning area 135 of the scanning base portion 150 and the document being scanned, thereby preventing light from entering the scanning mechanism of the scanning base portion 150 during scanning. In an example, the cover portion 105 may further include an automatic document feeder (ADF) that allows a user of the scanning machine 100 to automatically scan and/or photocopy multiple documents.

The detachable coupler 130 may be biased in its attachment with the cover housing 110 to provide an axial restoring force between the reflective sheet 120 and the cover housing 110. Such biasing may allow the reflective sheet 120 to account for variations in thickness of a document being scanned, thus mitigating light from entering under the reflective sheet 120 during scanning by the system 100. Such biasing may also allow the reflective sheet 120 to remain flat against a document placed on the glass of the system 100, maintaining the document at or near an optimal focus level for optical scanning of media placed on the glass. The reflective sheet 120 may be made of a pliant material having a reflective surface on at least one side thereof—the side that engages the planar transparent scanning area 135 of the system 100.

Additionally, the detachable coupler 130 may enable the reflective sheet 120 to be easily removed and re-attached to the cover housing 110 in the event that the reflective sheet 120 becomes detached from the cover housing 110 or otherwise needs replacement. The detachable coupler 130 may be substantially permanently affixed to the reflective sheet 120 by the fastener 140 to eliminate a user or technician from having to reposition the detachable coupler 130 at its proper location on the reflective sheet 120 after initial alignment, such as at a manufacturing facility. Should the reflective sheet 120 ever need to be replaced, for example in the event of damage to the reflective sheet 120, the detachable coupler 130 together with the damaged reflective sheet 120 may be removed from the cover housing 110 and a new reflective sheet 120 130 may be installed by simply inserting the detachable coupler 130 of the new reflective sheet 120 into the cover housing 110 and affixing (via fasteners) the couplers to the new reflective sheet.

As used herein, the term "substantially" is to convey an intended property or condition (e.g., as in permanent), while also allowing some variance in such property or condition. For instance, while it may be desired to permanently attach the coupler to the reflective sheet using a fastener, such fasteners may, in fact, fail in some circumstances (e.g., 5% of the time or another part). Thus, the use of the modifier substantially is to allow for such variations in the property or condition.

Figure 3:
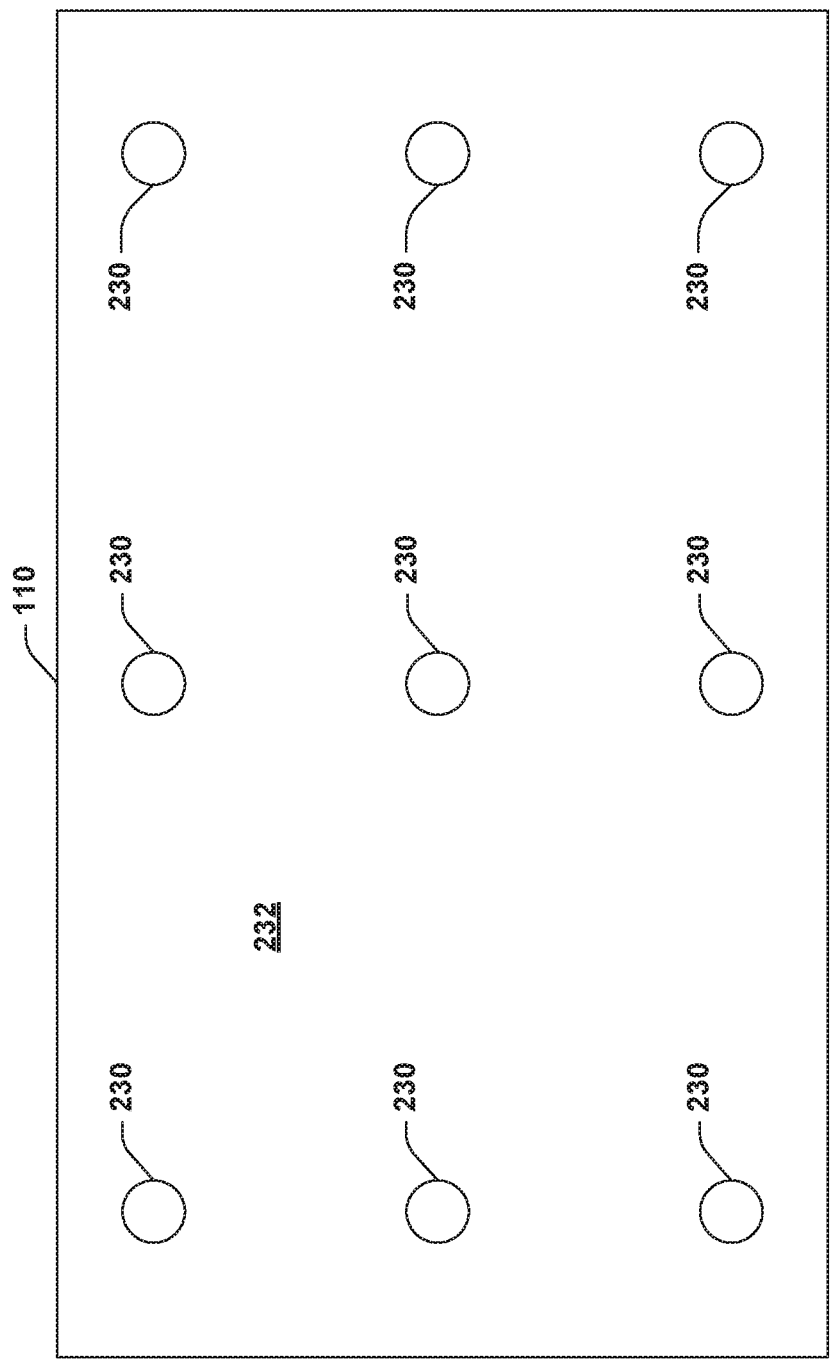
FIG. 3 illustrates an example bottom view of a cover housing.

FIG. 3 illustrates an example bottom view of the cover housing 110. The cover housing 110 may include a plurality of apertures 230. As viewed from the bottom of the cover housing 110, prior to attachment of the plurality of detachable couplers 130, the cover housing 110 may expose the plurality of apertures 230. The plurality of apertures 230 may be evenly distributed across a surface 232, or at least a portion of the surface that opposes the transparent scanning area of the scanning portion 150 (e.g., FIG. 2). The apertures 230 may extend from the surface 232 and into the cover housing 110. The plurality of apertures 230 may be sized (e.g., provide receptacles) to receive therein distal end portions of the plurality of detachable couplers 130. As an example, the cover housing 110 may include nine (9) even distributed apertures 230, three along each of the outer edges of the cover housing 110 and one approximately centered on the cover housing 110. The number of apertures 230 and corresponding detachable couplers 130 that are used to couple the reflective sheet 120 to the cover housing 110 may vary depending on the size of the reflective sheet 120, with fewer detachable couplers 130 being used with smaller reflective sheets 120, and vise versa. The number of apertures 230 and detachable couplers 130 may also depend on the pliancy of the reflective sheet 120, with fewer detachable couplers 130 being used with more rigid reflective sheets 120, and vise versa.

FIGS. 4A-4E illustrate different views of an example clip 310 that may be implemented as a coupler (e.g., coupler 130) for detachably coupling a reflective sheet (e.g., reflective sheet 120) to the cover housing (e.g., cover housing 110). As mentioned, a plurality of detachable couplers 130, each including such clip, may be used to attach a reflective sheet to the cover housing. Thus, the various views of FIGS. 4A-4E may be referred to for purposes for the following description in which the reference numbers refer to similar features in the various views.

The clip 310 may include a base 316, such can be a generally circular base portion. Two or more legs 314 may extend from the circular base 316 to terminate in outwardly protruding distal end portions 312 spaced apart from the base. The circular base 316 may include a substantially planar contact surface on the bottom thereof. The circular base 316 may be any diameter that provides a support for an end of a spring (see, e.g., FIGS. 6A and 6B) that comes into contact with the circular base 316. As an example, each clip may be a monolithic (e.g., integral) structure formed of a pliant (e.g., elastically deformable) material to permit radially inward movement of the legs 314 from a normal extension as well as return back to their normal extension. For instance, the clips may be formed of a plastic or similar material by an injection molding process or by other processes (e.g., extrusion, die casting or the like).

As shown in the example of FIGS. 4A-4E, the legs 314 may extend axially and perpendicularly from a central portion of the circular base 316 and terminate in the outwardly protruding portion 312 thereof. In some examples, the distal end of the outwardly protruding portion 312 may constitute a chamfered leading edge 318 to facilitate insertion of the legs 314 into a respective aperture 230 of the cover housing 110. For instance, the radially outer sidewall of the legs 314 may be sized and configured to approximate a size and a shape of the apertures 230 into which the clips 310 are inserted. This affords a secure fit that may limit transverse movement of the clips 310 once installed into the apertures 230, and may permit axial movement thereof within the aperture 230 commensurate with the length of the sidewall of the legs 314 extending between the base 316 and the outwardly protruding portion 312.

Figure 4A:
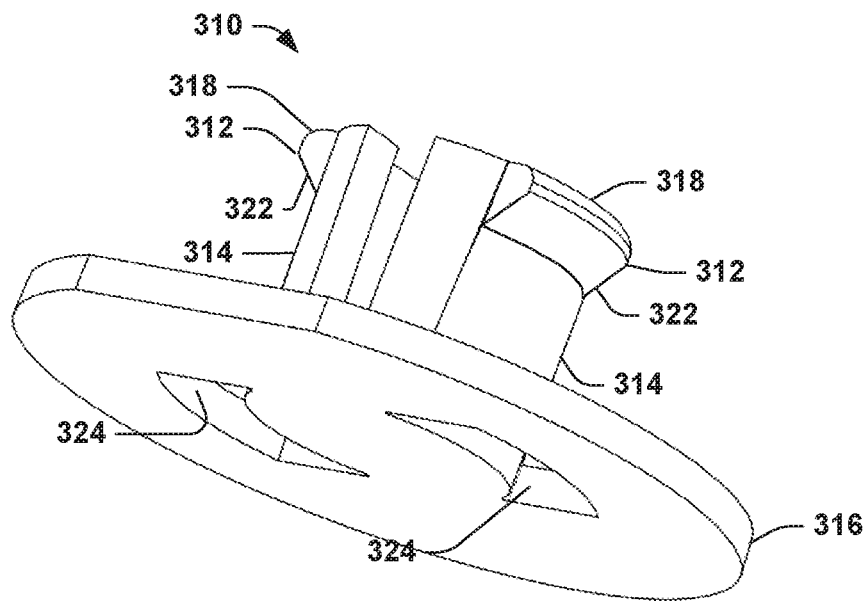
FIG. 4A illustrates an isometric view of an example clip for coupling a reflective sheet to the cover housing.
Figure 4B:
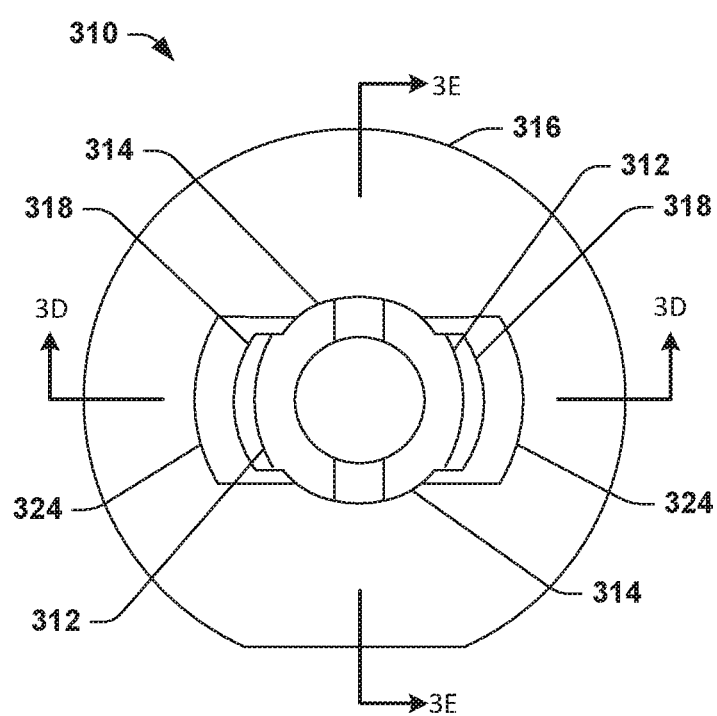
FIG. 4B illustrates a top view of the example clip of FIG. 4A.
Figure 4C:
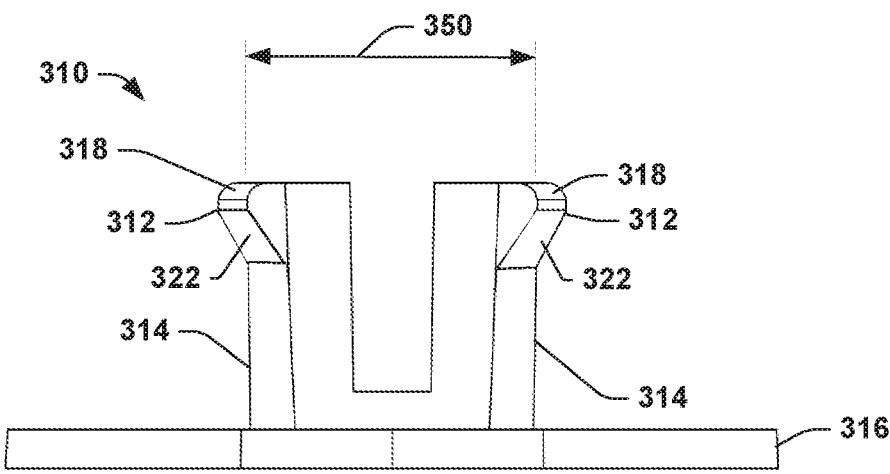
FIG. 4C illustrates a side view of the example clip of FIG. 4A.
Figure 4D:
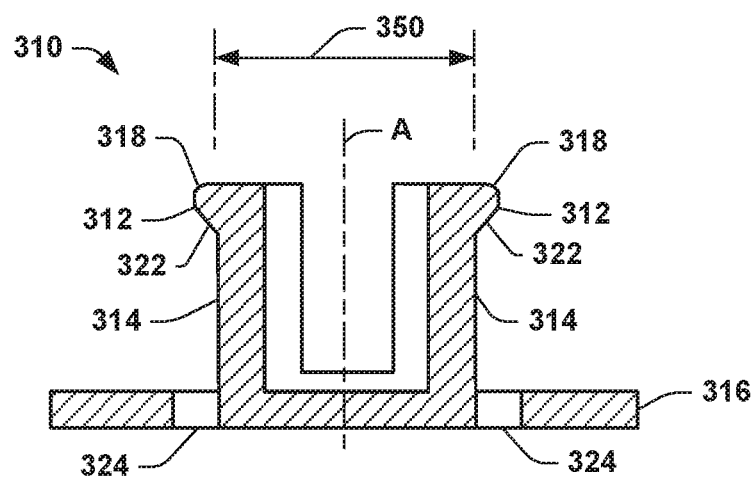
FIG. 4D illustrates a section view of the example clip of FIG. 4B taken along line 3D-3D.
Figure 4E:
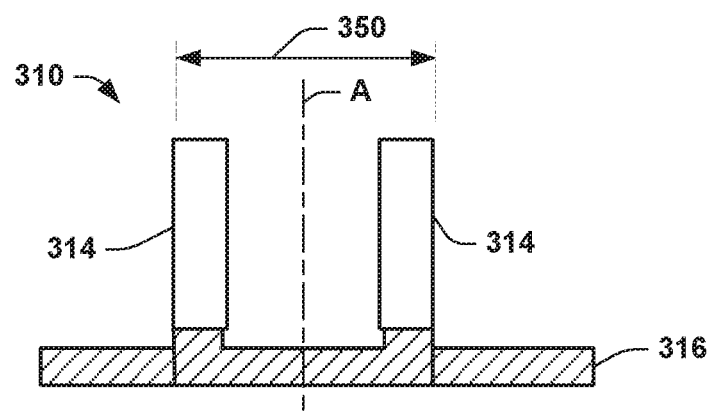
FIG. 4E illustrates a section view of the example clip of FIG. 4B taken along line 3E-3E.

Additionally, to facilitate insertion into the apertures 230, the legs 314 may be elastically deformable as to permit deflection from their normally extending position. For instance, the legs 314 may deflect radially inward slightly toward the central axis A to facilitate insertion of the clip 310 into the apertures 230 of the cover housing 110. Once inserted into the apertures 230, the legs of the clip 310 may return, approximately, to a form existing prior to insertion. The radially outer sidewall of the legs 314 may exert a restoring force against the apertures 230 to help secure the clip 310 in the apertures 230 of the cover housing 110 and help prevent the reflective sheet 120 from becoming unintentionally detached from the cover housing 110. As shown in the example of FIGS. 4C, 4D and 4E, a distance 350 between the radially outer surfaces of the sidewall of the legs 314 may be sized to approximate a diameter of the apertures 230. For instance, the distance 350 may be slightly narrower than in which the apertures 230 permit axial movement thereof within the apertures 230 once the detachable couplers 130 have been inserted. As described herein, a spring 500 placed around the legs 314 may provide an axial restoring force to help bias the base 316 (and reflective sheet 120) away from the cover housing 110. In another example, the distance 350 may be slightly wider than in which the legs 314 will engage the perimeter of the apertures 230 and may provide a friction fitting once the detachable couplers 130 are inserted into the apertures 230.

In addition to the outwardly protruding portions 312 including the chamfered edge 318 at the distal end to facilitate insertion of the clips 310 into the apertures 230, the outwardly protruding portions 312 may also include a tapering sidewall portion 322 to facilitate removal of the clip 310 from the aperture 230. For example, the tapering sidewall portion 322 on each leg 314 may taper radially inwardly and axially from a radially outermost portion of each outwardly protruding portion 312 in a direction of its base and may provide a trailing taper along each of the legs 314. The tapering sidewall portion 322 may be a flat surface or curved. Thus, the chamfered leading edge 318 may ease insertion of the plurality of detachable couplers 130, and thereby may prevent damage to the clip 310 during insertion of the plurality of detachable couplers 130. Similarly, the tapering sidewall portion 322 on the outwardly protruding portions 312 may facilitate removal of the plurality of detachable couplers 130 from the apertures 230, and thereby may prevent damage to the clip 310 during removal of the plurality of detachable couplers 130 from the cover housing 110.

In some examples, the base 316 may include slots 324 that extend through the base 316. As shown in the example of FIGS. 4A and 4B, the slots 324 may include a radially inner edge at a radial position that approximates the radially outer sidewall of the legs 314. The portion of the slots 324 closest to a center of the circular base 316 may include an arch that coincides with (or it can be slightly outside from) the outer sidewall outside edge of each of the legs 314. Each slot 324 may also include an outer edge, such as in the form of another arch spaced radially outwardly from its inner arch to constitute the portion of the crescent shaped slots 324 farthest from the center of the circular base 316. As an example, the slots 324 may be crescent shaped. In other examples, other shapes may be used. The radial width of the crescent shaped slots 324 may coincides with the width of the legs 314. The two crescent shaped slots 324 may provide access to the outer surface of the legs 314 during manufacture of the circular base 316 and may assist in removing the clip 310 from molding equipment used to manufacture the clip 310. The two crescent shaped slots 324 may also facilitate radially inward deflection of the legs 314 during insertion of the detachable couplers 130 into the apertures 230 as well as during removal of such couplers 130 from the cover housing 110.

Figure 5:
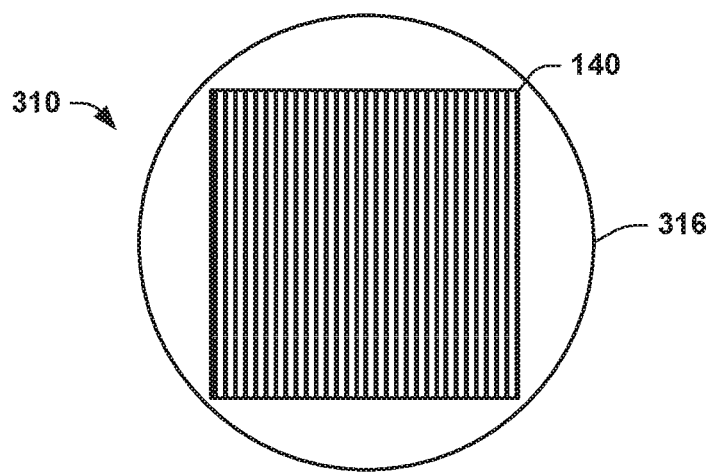
FIG. 5 illustrates an example fastener affixed to a base of the example clip shown in FIGS. 4A-4E.

FIG. 5 illustrates an example of a fastener 140 affixed to the clip 310. The fastener 140 may be positioned approximately centered on a planar contact surface of the circular base 316 that is opposite of the surface from which the legs 314 extend. In the example of FIG. 5, the edges and corners of the fastener 140 may be thus spaced from perimeter of the base 316. In other examples, the fastener 140 may extend beyond the perimeter of the circular base 316. Referring back to the example of FIG. 3 utilizing nine (9) apertures, nine (9) fasteners 140 may be affixed to nine (9) clips 310. The fasteners 140 may also attach to a surface of the reflective sheet 120 that is opposite the reflective surface thereof to thereby affix the reflective sheet to the clips 310. As mentioned, the clips 310 may be attached to the reflective sheet 120 in a position to provide for alignment of the reflective sheet 120 on the cover housing 110 and with respect to the glass window of the scanning device. As a further example, the fastener 140 may be a double-sided tape or a layer of adhesive material to provide a substantially permanent fixation to the circular base 316 and the reflective sheet 120. The thickness of the fastener 140 may be selected to assure that the overall height of the plurality of detachable couplers 130 inclusive of the fasteners 140 meets manufacturing requirements for an overall distance between the reflective sheet 120 and the cover housing 110. As an example, the fastener 140 may have a thickness that is approximately 1.5 mm to approximately 2.0 mm. The fastener 140 may be any shape, such as rectangular, round, oval, triangular, or any other shape that allows the clip 310 to be suitably affixed to the reflective sheet 120. In an example, the fastener 140 may be cut from a roll of appropriate thickness double-sided tape.

Figure 6A:
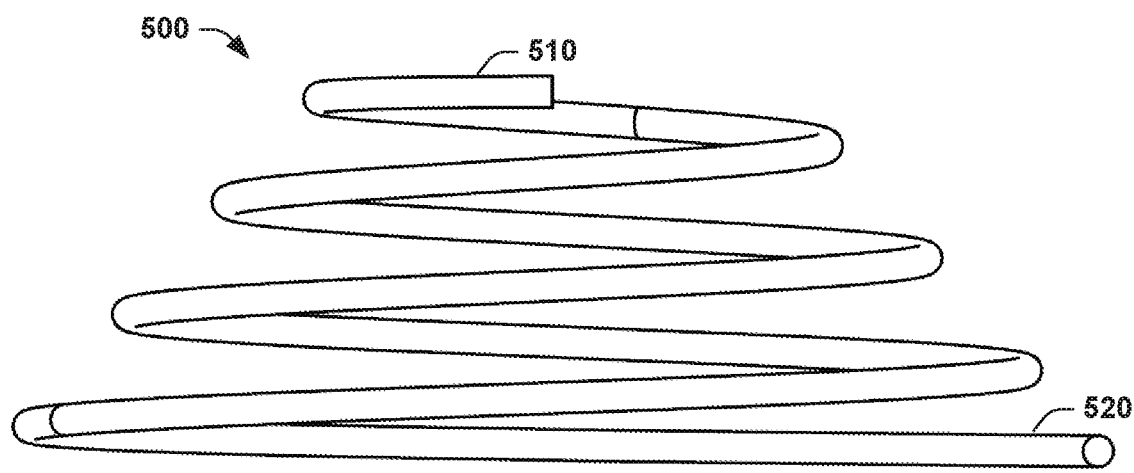
FIGS. 6A and 6B illustrate an example spring for use with the example clip shown in FIGS. 4A-4E.
Figure 6B:

FIGS. 6A and 6B illustrate an example resilient element constituting a spring 500 for use with the example clip 310 shown in FIGS. 4A-4E. The detachable coupler 130 may include the spring 500. In the example of FIG. 6A, the spring 500 may be in an uncompressed state having a conical shape with a smaller diameter end 510 spaced axially apart from a larger diameter end 520. Such a conical shape may enable the spring 500 to be compressed to a thickness (see, e.g., FIG. 6B). In the fully compressed state shown in FIG. 6B, the spring 500 may be compressed to a thickness that coincides with a thickness of the material from which the spring 500 is constructed. In an example, the spring 500 may be approximately 0.5 mm in height when fully compressed. The spring 500 may be constructed of spring steel, plastic, or any other resilient material that exerts an axial restoring force, such as to urge the base 316 of the clip 310 axially apart from the cover housing 110 when assembled, such as shown in FIG. 7.

Figure 7:
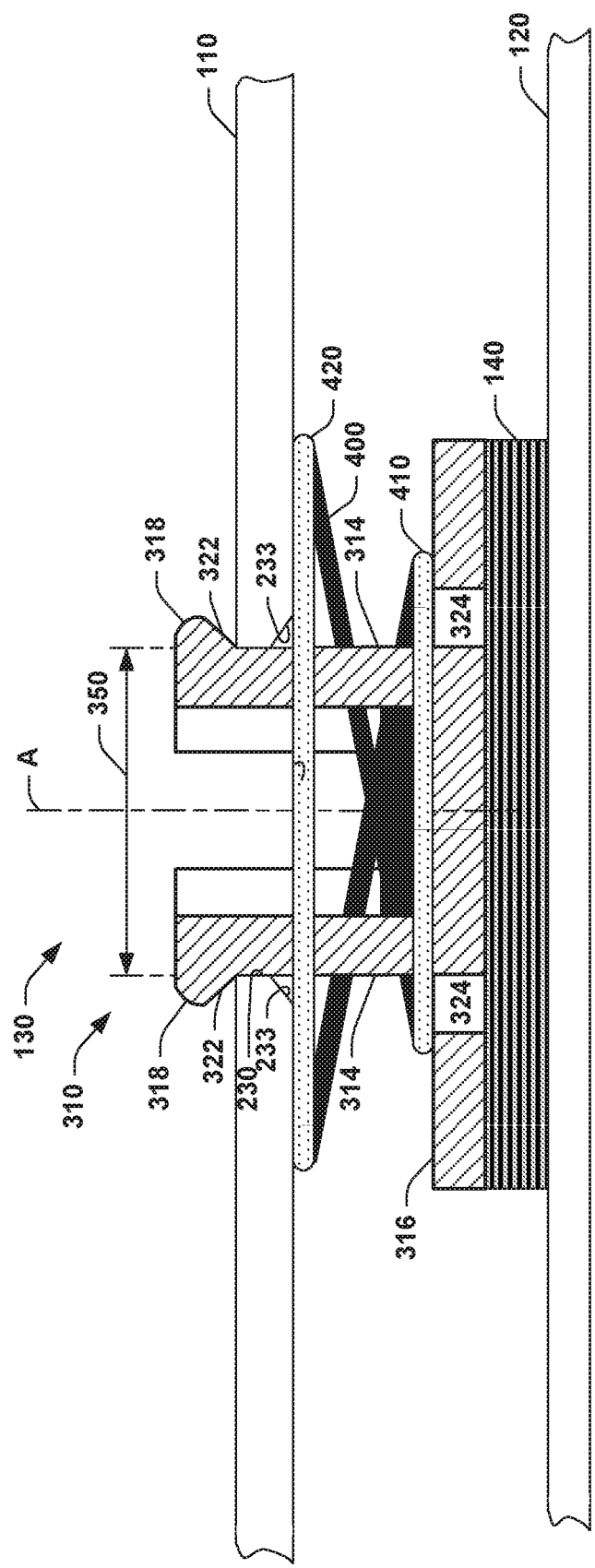
FIG. 7 illustrates a section view of an example detachable coupler inserted into an aperture of a cover housing.

FIG. 7 illustrates a section view of an example assembled detachable coupler 130 inserted into an aperture 230 of the cover housing 110 that may provide a flexible connection for the reflective sheet 120. While the example of FIG. 7 shows one coupler 130 connecting the reflective sheet 120 to the cover housing 110, as disclosed herein, a plurality of such couplers may be typically used. As illustrated, the spring 500 may be placed onto the clip 310 in a coaxial orientation circumscribing the legs 314 of the clip 310, together forming the detachable coupler 130. When distal end portion 312 of the detachable coupler 130 is inserted into the aperture 230, the spring 500 may compress and circumscribe an intermediate portion of the detachable coupler 130, the intermediate portion being a portion of the clip 310 extending between an adjacent surface of the cover housing 110 and the surface of the circular base 316 from which the legs 314 extend. In the example of FIG. 7, the spring 500 may be arranged with the larger diameter end 520 contacting the bottom of the cover housing 110 and the smaller diameter end 510 contacting the top surface of the base 316 of the clip 310. The spring 500 may exert an axial restoring force on and between the base of the clip 310 and the cover housing 110, which thus may transfer to the reflective sheet 120 via the fastener 140 fixed therebetween.

The assembled detachable coupler 130 may be inserted into the aperture 230 to secure the reflective sheet 120 with respect to the cover housing 110. To facilitate such insertion, the edge of the aperture 230 facing the reflective sheet 120 may include a leading chamfer 233, which may engage a corresponding chamfer (e.g., the chamfered leading edge 318) on the outwardly protruding portion 318. As mentioned, slots 324 formed in the circular base 315 may also facilitate radial deflection of the legs 314 during insertion of the detachable couplers 130 into the apertures 230. Once inserted, the chamfered leading edge 318 and the outer tapering sidewall portion 322 may extend beyond a distal surface of the aperture 230, such as may be on the inside of the cover housing 110. This extension may prevent the detachable coupler 130 from being easily removed from the aperture 230, may provide secure coupling of the reflective sheet 120 to the cover housing 110 while concurrently may permit resilient axial movement of each coupler 130 and the flexible sheet 120 by its attachment.

The fastener 140 may be aligned and affixed to the reflective sheet 120, as shown. Such alignment and affixation may be achieved, for example, by placing the reflective sheet 120, having a prescribed alignment with the planar transparent scanning area 135 of scanning base portion 150, beneath the cover housing 110 and on the planar transparent scanning area 135 of the scanning base portion 150, so that the reflective surface of the reflective sheet 120 may contact the planar surface of the scanning base portion 150. Then, with fasteners 140 affixed to each base, as shown, during the prescribed alignment, the cover housing 110 may be urged toward the reflective sheet 120 (e.g., to its closed position) to affix the exposed portion of fastener 140 to the reflective sheet 120. As a result, the reflective sheet 120 may be affixed to the cover housing 110 through the compliant detachable coupling and in a position that maintains alignment between the reflective sheet 120 and the surface of the scanning base portion 150 when the cover housing 110 is closed.

Figure 8:
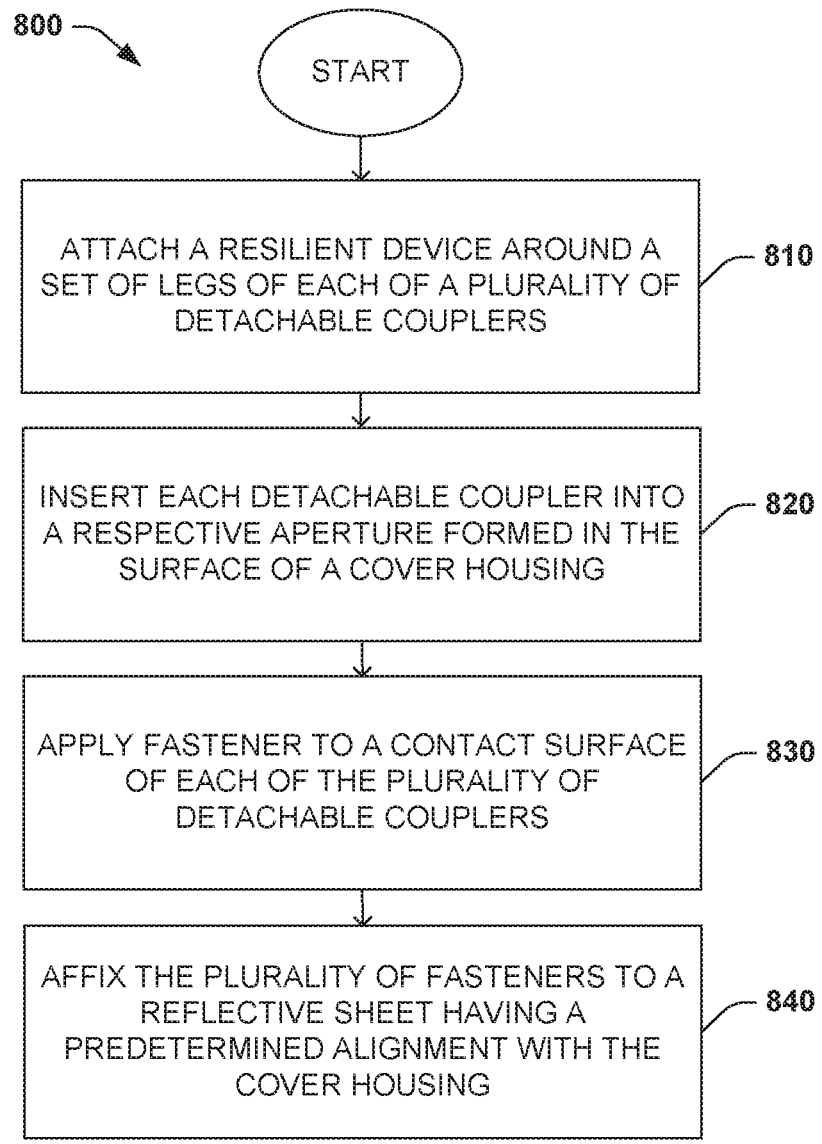
FIG. 8 illustrates an example method of coupling a reflective sheet to a cover housing.

In view of the foregoing structural and functional features described above, a method in accordance with various aspects of the present disclosure will be better appreciated with reference to FIG. 8. While, for purposes of simplicity of explanation, the method of FIG. 8 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure.

FIG. 8 illustrates an example method 800 of coupling a reflective sheet (e.g., reflective sheet 120) to a cover housing (e.g., cover housing 110 of a scanning device, such as may be part of an optical scanner, copier or multi-function peripheral). At 810, a resilient device (e.g., spring 500) may be attached around a set of legs (e.g., legs 314) of each of a plurality of detachable couplers (e.g., couplers 130). For example, each of the detachable couplers 130 may include a circular base 316 with a planar contact surface, and legs 314 that extend axially and perpendicularly from a central portion of the circular base 316 to terminate in an outwardly protruding portion 312 thereof.

At 820, the outwardly protruding portion 312 of each detachable coupler 130 may by inserted into a respective aperture (e.g., aperture 230) formed in a surface of the cover housing 110. With such insertion, for example, each of the resilient devices (e.g., springs 500) of the detachable couplers 130 may exert an axial restoring force on and between the circular base 316 and the cover housing 110. At 830, a fastener (e.g., fastener 140) may be applied to the contact surface of each of the circular bases 316 of the detachable couplers 130. At 840, the plurality of fasteners 140 may be affixed to a reflective sheet (e.g., reflective sheet 120) having a predetermined alignment with the cover housing 110.

In some examples, each of the legs 314 may have an tapering sidewall portion 322 that tapers radially and inwardly from the outwardly protruding portion 312 in a direction of its base to provide a trailing taper along each of the legs 314 adjacent to the outwardly protruding portion 312. Such coupling may facilitate removal and replacement of the reflective sheet 120. For example, each of the detachable couplers 130 may be removed from the cover housing 110 (e.g., facilitated by the tapering sidewall portion 322). The reflective sheet 120 may be replaced by repeating the method 800 with a new reflective sheet 120.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A device, comprising:
   a cover housing;
   a reflective sheet to hold media against a planar transparent scanning area of the device;
   a coupler to removably attach the reflective sheet to the cover housing, the coupler having a conical spring to exert an axial restoring force between the reflective sheet and the cover housing, the conical spring to constrain movement of the coupler and enabling movement thereof in an axial direction that is substantially perpendicular to the surface of reflective sheet; and
   a fastener to fix the coupler to the reflective sheet.

2. The device of claim 1, wherein the conical spring is coaxial with and circumscribing an intermediate portion of the coupler.

3. The device of claim 2, wherein the conical spring has one end having larger diameter to terminate in another end having a smaller diameter, the conical spring being arranged with its larger diameter end to contact the cover housing and its smaller diameter end to contact a base of the coupler to exert the axial restoring force between the reflective sheet and the cover housing.

4. The device of claim 1, wherein the device is part of one of a photocopier, a scanner or a multi-function peripheral.

5. The device of claim 1, wherein the coupler further comprises:
   a base having a planar contact surface to receive the fastener; and
   a plurality of legs extending axially and perpendicularly from a central portion of the base opposite the contact surface and terminating in an outwardly protruding portion thereof to provide a chamfered leading edge, the legs spaced apart from each other to approximate a width of respective apertures in the cover housing.

6. The device of claim 5, wherein each of the plurality of legs has an outer tapering sidewall portion that tapers radially inwardly from the outwardly protruding portion in a direction of its base to provide a trailing taper along each of the legs adjacent to the outwardly protruding portion to facilitate removal of the coupler from an aperture in the cover housing.

7. The device of claim 6, wherein the cover housing further comprises a plurality of evenly distributed apertures extending through the cover housing, wherein the outwardly protruding portion of the coupler is inserted into one of the plurality of apertures to provide compliancy across the reflective surface by the restoring force.

8. The device of claim 1, wherein the fastener is comprised of double-sided tape or an adhesive to fix the reflective sheet to a surface of the coupler and to another surface of the reflective sheet that is opposite the reflective surface thereof.

9. A device, comprising:
   a cover portion including a cover housing, a reflective sheet to hold media against a transparent scanning area of a photocopier, a plurality of couplers to removably attach the reflective sheet to the cover housing, each of the plurality of couplers having a conical spring to exert an axial restoring force between the reflective sheet and the cover housing, and a fasteners to fix each of the plurality of couplers to the reflective sheet, respectively, the conical springs to constrain movement of the coupler and enabling movement thereof in an axial direction that is substantially perpendicular to the surface of reflective sheet; and a scanning base portion attached to the cover portion, the scanning base portion having an optical scanning mechanism to optically scan media placed on the scanning base portion between the reflective sheet and a planar transparent scanning area of the scanning base portion.

10. The device of claim 9, wherein each conical spring is coaxial with and circumscribing an intermediate portion of a respective coupler.

11. The device of claim 10, wherein each conical spring has one end having a larger diameter to terminate in another end having a smaller diameter, each conical spring being arranged with its larger diameter end to contact the cover housing and its smaller diameter end to contact a base of the respective coupler.

12. The device of claim 9, wherein each fastener comprises at least one of double-sided tape or an adhesive.

13. The device of claim 9, wherein each of the plurality of couplers further comprises:
   a base having a planar contact surface to receive the fastener; and
   a plurality of legs extending axially and perpendicularly from a central portion of the base opposite the contact surface and terminating in an outwardly protruding portion thereof to provide a chamfered leading edge, the legs spaced apart from each other to approximate a width of respective apertures in the cover housing.

14. A device comprising:
   a cover housing including a plurality of apertures;
   a reflective sheet of pliant material having a reflective surface to hold media against a planar transparent scanning area of the device;
   a plurality of detachable couplers, each of the detachable couplers comprising:
      a base having a planar contact surface;
      a set of legs extending axially and perpendicularly from a central portion of the base to terminate in an outwardly protruding portion thereof, each outwardly protruding portion including a chamfered leading edge that resides within a respective aperture of the cover housing; and
      an outer tapering sidewall portion that tapers radially and inwardly from the outwardly protruding portion in a direction of its base to provide a trailing taper along each of the legs to facilitate removal of the respective detachable coupler from the respective aperture;
   a plurality of springs having an elongated conical shape extending axially from one end having a larger diameter to terminate in another end having a smaller diameter, each of the plurality of springs being coaxial with and circumscribing an associated set of legs of a respective detachable coupler with its larger diameter end engaging the cover housing and its smaller diameter end engaging a base of a respective detachable coupler to exert an axial restoring force between the cover housing and the base of the respective detachable coupler, and movement of each detachable coupler being constrained to move in the axial direction that is substantially perpendicular to the surface of the reflective sheet; and
   a plurality of fastening elements to fix each of the plurality of detachable couplers to the reflective sheet.

15. The device of claim 14, wherein each of the plurality of fastening elements comprises double-sided tape or an adhesive to fix the reflective sheet to the contact surface of each respective detachable coupler and to another surface of the reflective sheet that is opposite the reflective surface thereof.

* * * * *